Aug. 11, 1931.     O. A. MATSON     1,818,148
SPADING DEVICE
Filed July 29, 1927     2 Sheets-Sheet 1

INVENTOR
O. A. MATSON
BY
ATTORNEY

Aug. 11, 1931. O. A. MATSON 1,818,148
SPADING DEVICE
Filed July 29, 1927 2 Sheets-Sheet 2

INVENTOR
O. A. MATSON
BY
ATTORNEY

Patented Aug. 11, 1931

1,818,148

UNITED STATES PATENT OFFICE

OSCAR AKE MATSON, OF CHICAGO, ILLINOIS

SPADING DEVICE

Application filed July 29, 1927. Serial No. 209,351.

My invention relates to improvements in spading devices, and it consists in the combinations, constructions, and arrangements herein described and claimed.

An object of my invention is to provide a spading device which has novel means for automatically permitting the spading units to stop at any point during their operative movement.

A further object of my invention is to provide a device of the type described which has novel means for automatically moving the gear shift lever of the tractor into neutral position when one or more of the units strike an obstacle.

A further object of my invention is to provide a device of the type described which has novel means for raising and lowering the spading units.

A further object of my invention is to provide a device of the type described which has novel means for cushioning the tools and the movable frame.

Other objects and advantages will appear in the following specification, and the novel features of the invention will be particularly pointed out in the appended claims.

Figure 1:
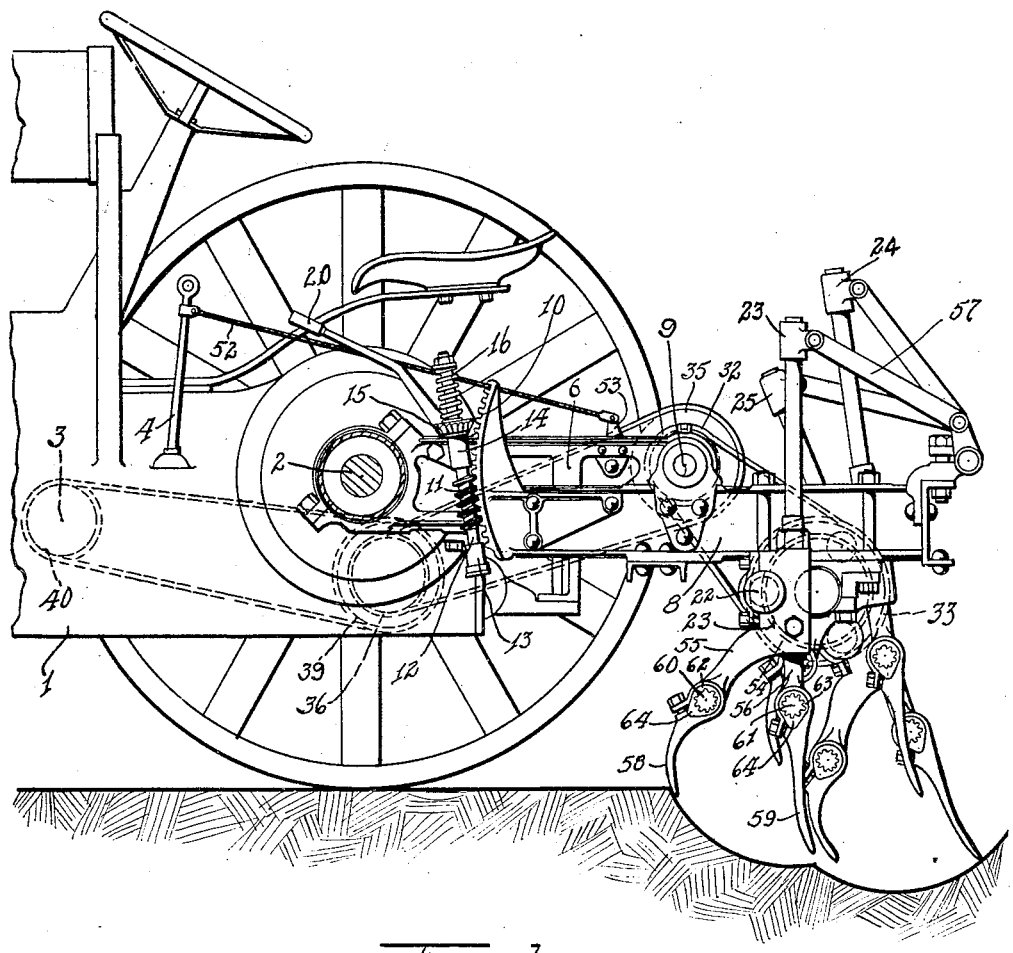
Figure 3:
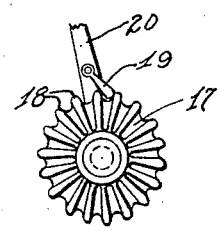
Figure 2:
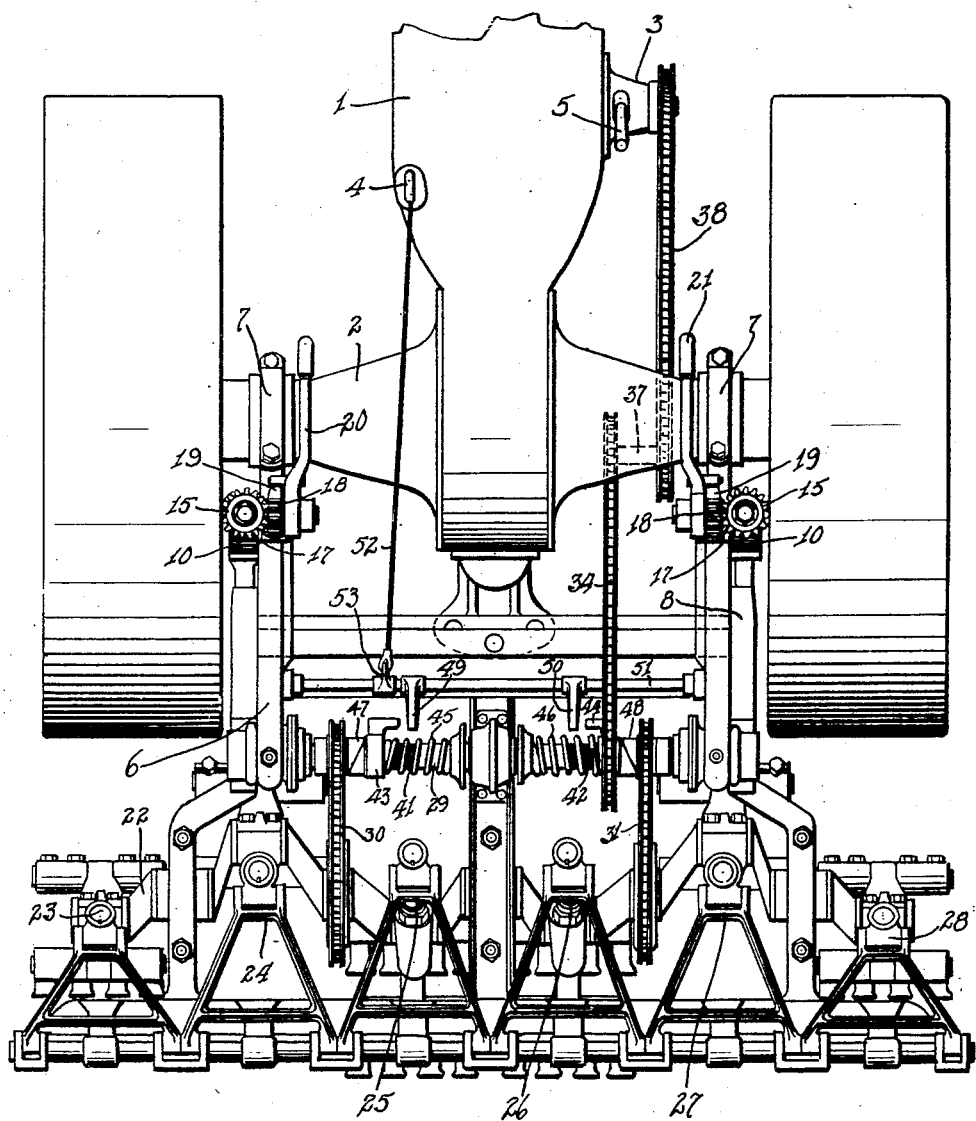

My invention is illustrated in the accompanying drawings, forming part of this application, in which Figure 1 is a side elevation of my device, as applied to a tractor, Figure 2 is a plan view of that shown in Figure 1, and Figure 3 is an enlarged detail sectional view of a portion of the device.

In carrying out my invention, I make use of a tractor 1 having a rear axle 2, a power take-off 3 and a gear shift lever 4. A lever 5 is operatively connected to the power take-off for connecting the power take-off with the motor of the tractor. I provide a stationary frame 6 which is rigidly secured to the axle 2 at 7. A movable frame 8 is rotatably mounted upon stub shafts 9 which are carried by the stationary frame 6. The movable frame 8 is provided with arcuate-shaped racks 10 at the forward ends thereof.

A means is provided for moving the movable frame 8 about the shafts 9 as a pivot. This means is composed of worms 11 mounted upon shafts 12 which extend through bearings 13 and 14 and are provided with beveled gears 15. The beveled gears 15 are keyed to the shafts 12 and are held in engagement with the bearings 14 by expansive springs 16. Gears 17 are provided with beveled teeth which are disposed in mesh with the beveled gears 15. The outer peripheries of the gears 17 are provided with ratchet teeth 18 into which pawls 19 of hand levers 20 and 21 may engage.

A crank shaft 22 is rotatably carried by the movable frame 8. A plurality of spading units 23, 24, 25, 26, 27 and 28 are operatively connected to the crank shaft 22. The crank shaft 22 is operatively connected to a drive shaft 29 through chains 30 and 31 which are mounted upon sprocket wheels 32 of the drive shaft 29 and sprocket wheels 33 of the crank shaft 22. The drive shaft 29 is operatively connected to the power take-off means 3 by a chain 34 which passes over a sprocket wheel 35 of the drive shaft 29 and a sprocket wheel 36 of a stub shaft 37, and a chain 38 which passes over a sprocket wheel 39 of the stub shaft 37 and a sprocket wheel 40 of the power take-off means 3.

The drive shaft 29 is provided with spline portions 41 and 42 for allowing knock-out cams 43 and 44 to move thereupon against the tension of springs 45 and 46. The cams 43 and 44 are held by the tension of the springs 45 and 46 against cam portions 47 and 48 of the sprocket wheels 32 with sufficient force to rotate the sprocket wheels and their cooperating parts as the drive shaft is rotated.

Cam levers 49 and 50 are rigidly mounted upon a movable bar 51 which is carried by the stationary frame 6. The gear shift lever 4 is operatively connected to a bar 51 by a rod or wire rope 52 and a lever 53.

The spading units are identical in construction. Therefore a description of one will apply to them all. By viewing the spading unit 23 in Figure 1, it will be noted that the unit is composed of a frame or casing 54 which is rotatably mounted upon the crank shaft 22 and which has a transversely extending projection 55. A rod 56 extends through and is adjustably held by the frame 54. The upper extremity of the rod 56 is operatively connected to the movable frame 8 through a link 57.

Spading tools 58 and 59 are removably secured to the projection 55 and the rod 56, respectively. The means for securing the spading tools to their respective members consists of feathered shafts 60 and 61 having resilient cushions 62 and 63 disposed thereon and within the spading tools. The cushions 62 and 63 are provided with enlarged portions 64 beneath the shafts 60 and 61 where the cushioning is needed the most. The feathered shafts provide a means whereby the cushions are held against rotation with respect thereto.

From the foregoing description of the various parts of the device, the operation thereof may be readily understood. To operate the device, the motor of the tractor is started in the usual manner and the gear shift lever 4 is actuated to start the tractor in a forward motion. The lever 5 of the power take-off 3 is then actuated to operatively connect the spading units with the motor. Up to this point, the movable frame, together with the various parts carried thereby, is in a position whereby the spading tools are free from the ground. The hand levers 20 and 21 are then actuated for rotating the gears 18 and 15 which in turn rotate the worms 11. This movement of the worms 11 which are in mesh with the racks 10 causes the movable frame to rotate about its pivot and bring the spading tools into engagement with the ground. This operation is continued until the spading units are lowered to a desired depth and then the hand levers are released.

Let as assume that the tools of the spading unit 24 strike a rock or other obstacle too heavy to move. In such a case, the frictional contact between the knock-out cam 43 and the cam member 47 is not sufficient to continue the actuation of the spading unit 24. Therefore, the knock-out cam 43 will be forced away from the cam member 47 against the tension of the spring 45 by the aid of the spline 41 and will engage with the cam lever 49. The engaging of the knock-out cam 43 with the cam lever 49 will rotate the bar 51 a sufficient distance to move the gear shift lever 4 from the operative position into neutral position. By so doing, the forward movement of the tractor is stopped and the operator can remove the obstacle and allow the device to continue its forward operative movement in the usual manner. As the gear shift lever 4 is moved into neutral position automatically, the operator immediately knows what has taken place and he may at that time actuate the lever 5 for disengaging the spading units from the motor 3. The rod or wire rope 52 can, if preferred, be arranged to impress the clutch on the tractor, thereby stopping the forward movement of the tractor instead of actuating the gear shift lever 4, as now shown.

Cushioning means are provided to neutralize the shock and strain on the device when the knock-out cams 43 and 44 are caused to function as the spading tools strike an obstacle too great to be moved without causing injury thereto. This cushioning means also under normal conditions will completely absorb the strain and vibration as the spading tools strike the ground. Another feature of this cushioning means is that it will enable the spading tools to ride over an obstruction, such as a stone or root, if the obstruction is not too high to stop the spading tools as the spading tools are digging. This will prevent the knock-out cams from escaping, thus allowing the tractor to continue in its forward movement. This means consists of the resilient cushions 64 and the spring 16. As the spading tools strike an obstacle, the movable frame tends to rotate about its pivot, causing the racks 10 to draw downwardly upon the worms 11 against the tension of the springs 16. It is obvious that the knock-out cam 44 will engage with the cam lever 50 and move the gear shift lever 4 into neutral position when any of the spading units 26, 27, or 28 strike an obstacle which cannot be moved thereby.

When the operator wishes to raise the spading tools above the level of the ground, he reverses the pawls 19 and actuates the hand levers 20 and 21, thus rotating the gears 18 and 15 in the opposite direction and moving the racks 10 downwardly.

I claim:

1. The combination with a tractor having a gear shift lever adapted to be moved into an operative position from neutral position, of a spading unit, a drive shaft, said spading unit operatively connected to said drive shaft, means operatively connecting said drive shaft with said tractor, and means for automatically moving said gear shift lever into neutral position when said spading unit strikes an obstacle.

2. The combination with a tractor having a power take-off and a gear shift lever adapted to be moved into an operative position from neutral position, of spading units, a drive shaft, means operatively connecting said drive shaft with said spading units, means operatively connecting said drive shaft with said tractor, knock-out cams carried by said drive shaft, cam levers operatively connected to said gear shift lever, and an overload release device for automatically moving either or both of said knock-out cams into engagement with either or both of said cam levers when one or more of said spading units strike an obstacle, whereby said gear shift lever may be automatically moved from the operative position into the neutral position.

3. In a device of the type described, a stationary frame, a movable frame adjustably mounted upon said stationary frame, spading units carried by said movable frame, a rack carried by said movable frame, a worm in mesh with said rack, a worm shaft, a gear carried by said worm shaft, a lever pivotally carried by said stationary frame, a pawl carried by said lever, and means carried by said gear for receiving said pawl for operatively connecting said lever with said gear, whereby the actuation of said lever may rotate said gear and said worm for moving said movable frame with respect to said stationary frame.

4. In a device of the type described, a stationary frame, a movable frame adjustably mounted upon said stationary frame, spading units carried by said movable frame, a rack carried by said movable frame, a worm in mesh with said rack, a worm shaft, means carried by said stationary frame for rotating said worm for moving said movable frame with respect to said stationary frame, and resilient means carried by said worm shaft whereby said movable frame may move when said spading units strike an obstacle.

5. The combination with a tractor, of a spading device operatively connected to said tractor whereby the forward movement of said tractor will impart an operative movement to said spading device, means actuated by an overload for automatically stopping the operation of said spading device, and means cooperating with said last-named means for substantially simultaneously stopping the forward movement of said tractor.

6. In a device of the type described, a spading device, having a forward operative movement, a frame, a power driven crank shaft mounted on said frame, spading units mounted on said crank shaft, and friction means operative by an overload for automatically stopping the operation of said power driven crank shaft and means cooperating with said last named means for substantially simultaneously stopping the forward operative movement of said spading device.

OSCAR AKE MATSON.